United States Patent
Hendershot et al.

(10) Patent No.: US 12,441,646 B2
(45) Date of Patent: Oct. 14, 2025

(54) METHOD FOR TIN BATH MONITORING AND CONTROL

(71) Applicant: Air Products and Chemicals, Inc., Allentown, PA (US)

(72) Inventors: Reed Jacob Hendershot, Orefield, PA (US); Liang He, Allentown, PA (US); Michael J. Gallagher, Coopersburg, PA (US); Ranajit Ghosh, Macungie, PA (US)

(73) Assignee: AIR PRODUCTS AND CHEMICALS, INC., Allentown, PA (US)

( * ) Notice: Subject to any disclaimer, the term of this patent is extended or adjusted under 35 U.S.C. 154(b) by 661 days.

(21) Appl. No.: 17/434,654

(22) PCT Filed: Mar. 20, 2020

(86) PCT No.: PCT/US2020/023806
§ 371 (c)(1),
(2) Date: Aug. 27, 2021

(87) PCT Pub. No.: WO2020/191275
PCT Pub. Date: Sep. 24, 2020

(65) Prior Publication Data
US 2022/0169549 A1 Jun. 2, 2022

Related U.S. Application Data

(60) Provisional application No. 62/821,363, filed on Mar. 20, 2019.

(51) Int. Cl.
*C03B 18/22* (2006.01)

(52) U.S. Cl.
CPC .................................... *C03B 18/22* (2013.01)

(58) Field of Classification Search
CPC ...................................................... C03B 18/22
See application file for complete search history.

(56) References Cited

U.S. PATENT DOCUMENTS

| | | | | |
|---|---|---|---|---|
| 3,486,869 A | * | 12/1969 | Augustin | C03B 18/16 65/168 |
| 3,860,406 A | * | 1/1975 | Basler | C03B 18/06 65/182.4 |

(Continued)

FOREIGN PATENT DOCUMENTS

| | | |
|---|---|---|
| CN | 101326129 A | 12/2008 |
| CN | 106977080 A | 7/2017 |

(Continued)

OTHER PUBLICATIONS

European Search Report, Nov. 18, 2022, 7 pgs.

(Continued)

*Primary Examiner* — Cynthia Szewczyk
(74) *Attorney, Agent, or Firm* — Matthew R. Weaver

(57) ABSTRACT

A method of controlling defects in a glass product produced in a tin bath furnace includes measuring at least one parameter of an atmosphere associated with the tin bath furnace, wherein the parameter is selected from the group consisting of dew point and density, correlating the measured parameter with defects in the glass product, and controlling the measured parameter in a direction corresponding to decreased defects in the glass product by controlling a flow rate of a process gas relative to the furnace wherein the process gas includes one or more of hydrogen and nitrogen.

22 Claims, 10 Drawing Sheets

(56) References Cited

U.S. PATENT DOCUMENTS

| | | |
|---|---|---|
| 2002/0162358 A1 | 11/2002 | Jeanvoine et al. |
| 2006/0242995 A1 | 11/2006 | Bookbinder et al. |
| 2006/0242996 A1 | 11/2006 | Deangelis et al. |
| 2007/0149380 A1 | 6/2007 | Dorfeld et al. |
| 2007/0227190 A1 | 10/2007 | Smith et al. |

FOREIGN PATENT DOCUMENTS

| | | | | |
|---|---|---|---|---|
| DE | 10309465 A1 * | 9/2004 | ............. | C03B 18/20 |
| EP | 3617158 A1 * | 3/2020 | ............. | C03B 18/20 |
| JP | 2007505027 A | 3/2007 | | |
| JP | 2008528926 A | 7/2008 | | |
| WO | WO-2007017616 A2 * | 2/2007 | ............. | C03B 18/20 |
| WO | 07067799 A2 | 6/2007 | | |
| WO | WO-2008021023 A1 * | 2/2008 | ........... | B01D 53/002 |

OTHER PUBLICATIONS

CN First Office Action, Nov. 3, 2022, 10 pgs.
Korean Intellectual Property Office, The International Search Report and The Written Opinion of the International Searching Authority, Jul. 10, 2020, for International Application No. PCT/US2020/023806.

* cited by examiner

METHOD FOR TIN BATH MONITORING AND CONTROL

CROSS-REFERENCE TO RELATED APPLICATIONS

This application claims priority from U.S. Provisional Patent Application No. 62/821,363 filed on Mar. 20, 2019, which is incorporated by reference herein in its entirety.

BACKGROUND

Use of measurements in the tin bath atmosphere has been done in the past. For example, one commercial system by Siemens measures O2, H2, and dew point, and CN106977080A discusses controlling the atmosphere using sensors for H2 and O2. In addition, patents related to using H2/N2 in tin bath atmospheres goes back to at least 1967 (see, e.g., U.S. Pat. No. 3,337,322). See also Glass Technol.: Eur. J. Glass Sci. Technol. A, December 2012, 53 (6), 261-272, Behavior of oxygen in the tin bath used in float glass production, However, despite a long history of using H2 and N2, and the marketing of measuring systems and methods, there still exists a challenge in controlling the atmosphere to minimize glass defects that occur. These challenges stem from the cost of purchasing online analytical equipment and the challenge in correlating the measurement with the defects that occur. The present invention seeks to overcome these challenges.

SUMMARY

Aspect 1. A method of controlling a tin bath furnace atmosphere, comprising: measuring a density of an atmosphere associated with the furnace; measuring a second parameter of the atmosphere associated with the furnace, wherein the second parameter is selected from: oxygen concentration and dew point; correlating the measured density and measured second parameter with defects in the finished glass product; and controlling a flow rate of process gas relative to the furnace, wherein the process gas includes one or more of hydrogen and nitrogen.

Aspect 2. The method of aspect 1, wherein the controlled flow rate is selected from: a flow rate of process gas into the furnace and a flow rate of gas vented from the furnace.

Aspect 3. The method of aspect 1, wherein the atmosphere is within the furnace.

Aspect 4. The method of aspect 1, wherein the atmosphere is of a vent flow from the furnace.

Aspect 5. The method of aspect 1, wherein the atmosphere is of a recycle gases vented from and recirculated back into the furnace.

Aspect 6. The method of aspect 1, wherein the atmosphere is of a gas flow into the furnace.

Aspect 7. The method of aspect 1, further comprising: optimizing furnace gas usage by taking into account a difference between one or more conditions of an inlet gas, a furnace gas, and a vent gas.

Aspect 8. The method of aspect 7, further comprising: determining a difference in a component concentration between the furnace gas and the vent gas; and when the difference is large, increasing gas inlet flow.

Aspect 9. The method of aspect 7, further comprising: extracting an unpurified recycle gas from the furnace; cleaning up the unpurified recycle gas to create a purified recycle gas; mixing the purified recycle gas with an inlet gas; flowing the mixture of the inlet gas and the purified recycle gas into the furnace; determining a difference in a component concentration between the unpurified recycle gas and the purified recycle gas; and when the difference is large, increasing gas inlet flow.

Aspect 10. The method of aspect 4, further comprising: measuring a pressure differential and a temperature differential in the vent flow; and based on the measured pressure differential and the measured temperature differential, determining vent flow direction and vent flow rate.

Aspect 11. The method of aspect 3, further comprising: measuring a pressure differential in the furnace; and based on the measured pressure differential, determining furnace flow direction.

Aspect 12. A method of controlling a tin bath furnace atmosphere, comprising: measuring a redox state of molten tin within a tin bath; measuring a density of an atmosphere associated with the furnace; correlating the redox state and the measured density with defects in the finished glass product; and controlling a flow rate of process gas relative to the furnace, wherein the process gas includes one or more of hydrogen and nitrogen.

Aspect 13. A method of controlling a tin bath furnace atmosphere, comprising: measuring an inlet molten glass temperature of a tin bath; measuring a second parameter of an atmosphere associated with the furnace, wherein the second parameter is selected from: oxygen concentration and dew point; correlating the inlet molten glass temperature of the tin bath and measured second parameter with defects in the finished glass product; and controlling the local temperature in the tin bath and/or the upstream glass temperature in the glass melting furnace.

Aspect 14. A method of controlling a tin bath furnace atmosphere, comprising: measuring a density of an atmosphere associated with the furnace; measuring hydrogen sulfide concentration in the atmosphere; correlating the measured density and hydrogen sulfide concentration with defects in the finished glass product; and controlling vent flows from the furnace to minimize vaporized sulfur species from the atmosphere.

Aspect 15. A method of controlling defects in a glass product produced in a tin bath furnace, comprising: measuring a dew point of an atmosphere associated with the tin bath furnace; correlating the measured dew point with defects in the glass product; and controlling the dew point in a direction corresponding to decreased defects in the glass product by controlling a flow rate of a process gas relative to the furnace, wherein the dew point corresponds to a water vapor concentration in the atmosphere, and wherein the process gas includes one or more of hydrogen and nitrogen.

Aspect 16. The method of aspect 15, further comprising: measuring a density of the atmosphere associated with the furnace, wherein the measured density corresponds to a hydrogen concentration in the atmosphere; and in addition to controlling the dew point, controlling the ratio of hydrogen to water vapor concentrations in the atmosphere in a direction corresponding to decreased defects in the glass product by controlling the flow rate of the process gas relative to the furnace.

Aspect 17. The method of aspect 15 or aspect 16, wherein controlling the flow rate of the process gas causes a decrease in the dew point of the atmosphere.

Aspect 18. The method of aspect 17, wherein controlling the flow rate of the process gas causes an increase in the hydrogen concentration in the atmosphere.

Aspect 19. The method of any one of aspects 15 to 18, further comprising: correlating a line speed of glass production with defects in the glass product; and controlling the flow rate of the process gas in a direction corresponding to decreased defects in the glass product.

Aspect 20. The method of any one of aspects 15 to 19, further comprising: periodically changing a ribbon width of the glass product being produced in the tin bath furnace.

Aspect 21. The method of aspect 20, wherein changing the ribbon width is accomplished by decreasing the ribbon width.

Aspect 22. A method of controlling defects in a glass product produced in a tin bath furnace, comprising: measuring at least one parameter of an atmosphere associated with the tin bath furnace, wherein the parameter is selected from the group consisting of dew point and density; correlating the measured parameter with defects in the glass product; and controlling the measured parameter in a direction corresponding to decreased defects in the glass product by controlling a flow rate of a process gas relative to the furnace, wherein the process gas includes one or more of hydrogen and nitrogen.

Aspect 23. The method of aspect 22, wherein the one parameter is dew point, and wherein the dew point corresponds to a water vapor concentration in the atmosphere.

Aspect 24. The method of aspect 22, wherein the one parameter is density, and wherein the density corresponds to a hydrogen concentration in the atmosphere.

Aspect 25. The method of aspect 22, wherein the one parameter is density, and wherein the density corresponds to a gas composition in the atmosphere indicative of oxygen leakage into the furnace.

Aspect 26. The method of aspect 23, further comprising: measuring a density of the atmosphere associated with the furnace, wherein the measured density corresponds to hydrogen concentration in the atmosphere; and in addition to controlling the dew point, controlling a ratio of hydrogen to water vapor concentrations in the atmosphere in a direction corresponding to decreased defects in the glass product by controlling the flow rate of the process gas relative to the furnace.

Aspect 27. The method of aspect 23, further comprising: measuring a density of the atmosphere associated with the furnace, wherein the measured density corresponds to a gas composition in the atmosphere indicative of oxygen leakage into the furnace; and in addition to controlling the dew point, controlling a gas composition in the atmosphere in a direction corresponding to decreased defects in the glass product by controlling the flow rate of the process gas relative to the furnace.

Aspect 28. The method of any one of aspects 22, 23, 26, and 27, wherein controlling the flow rate of the process gas causes a decrease in the dew point of the atmosphere.

Aspect 29. The method of any one of aspects 22, 24, and 26, wherein controlling the flow rate of the process gas causes an increase in the hydrogen concentration in the atmosphere.

Aspect 30. The method of any one of aspects 22, 25, and 27, wherein controlling the flow rate of the process gas causes a decrease in the oxygen concentration in the atmosphere.

Aspect 31. The method of any one aspects 22 to 30, further comprising: correlating a line speed of glass production with defects in the glass product; and controlling the flow rate of the process gas line speed to be below a value corresponding to an acceptable in a direction corresponding to decreased level of defects in the glass product.

Aspect 32. The method of any one of aspects 22 to 31, wherein the controlled flow rate is selected from: a flow rate of process gas into the furnace and a flow rate of gas vented from the furnace.

Aspect 33. The method of any one of aspects 22 to 32, wherein the atmosphere is within the furnace.

Aspect 34. The method of any one of aspects 22 to 33, wherein the atmosphere is of a vent flow from the furnace.

Aspect 35. The method of any one of aspects 2 to 34, wherein the atmosphere is of a recycle gases vented from and recirculated back into the furnace.

Aspect 36. The method of any one of aspects 22 to 35, wherein the atmosphere is of a gas flow into the furnace.

Aspect 37. The method of any one of aspects 22 to 36, further comprising: optimizing furnace gas usage by taking into account a difference between one or more conditions of an inlet gas, a furnace gas, and a vent gas.

Aspect 38. The method of aspect 37, further comprising: determining a difference in a component concentration between the furnace gas and the vent gas; and when the difference is large, increasing gas inlet flow.

Aspect 39. The method of aspect 37, further comprising: extracting an unpurified recycle gas from the furnace; cleaning up the unpurified recycle gas to create a purified recycle gas; mixing the purified recycle gas with an inlet gas; flowing the mixture of the inlet gas and the purified recycle gas into the furnace; determining a difference in a component concentration between the unpurified recycle gas and the purified recycle gas; and when the difference is large, increasing gas inlet flow.

Aspect 40. The method of aspect 33, further comprising: measuring a pressure differential in the furnace; and based on the measured pressure differential, determining furnace flow direction.

Aspect 41. The method of aspect 34, further comprising: measuring a pressure differential and a temperature differential in the vent flow; and based on the measured pressure differential and the measured temperature differential, determining vent flow direction and vent flow rate.

BRIEF DESCRIPTION OF THE DRAWINGS

The present invention will hereinafter be described in conjunction with the appended figures wherein like numerals denote like elements.

DETAILED DESCRIPTION

Figure 10:
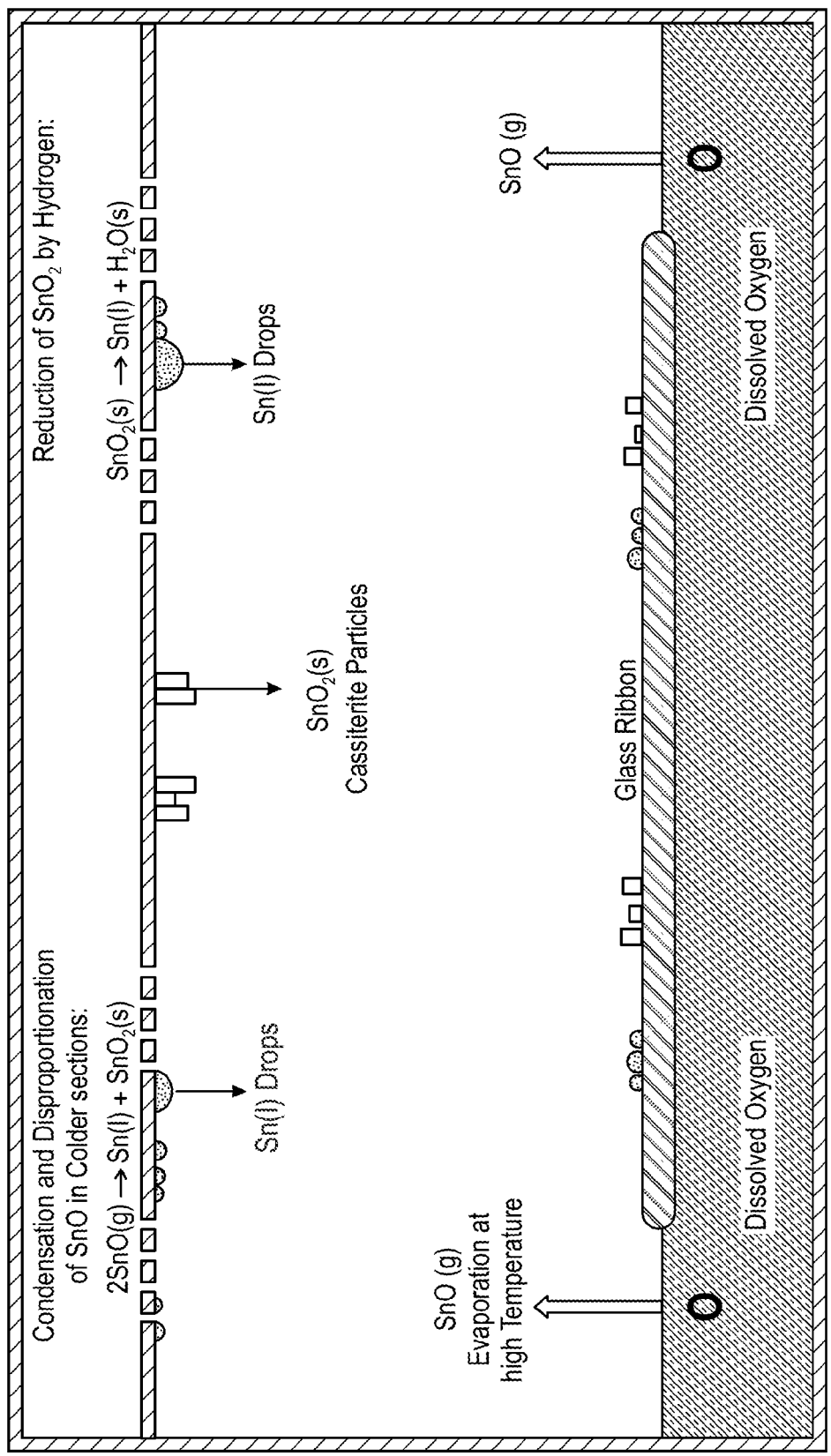
FIG. 10 is a prior art graphic showing important aspects of a tin bath process for making glass.

With reference to FIG. 10, it is known in the float glass industry that oxygen in a tin bath furnace can negatively impact the quality of the glass. Sources of oxygen in a tin bath furnace are typically either due to furnace leakage or oxygen coming from the glass itself.

Hydrogen (H2) in the atmosphere above the tin bath can help prevent oxygen due to furnace leakage from oxidizing the tin bath, and the presence of hydrogen, reacting with oxygen, produce water vapor (H2O) in the atmosphere above the tin bath.

Oxygen in glass could react with either (a) hydrogen in the atmosphere at the top surface of the glass ribbon (on the tin bath) to produce H2O in the atmosphere (i.e., 2H2+O2→2H2O); or (b) tin at the bottom surface of glass ribbon, to produce SnO2 (solid) or SnO (gas).

SnO2 (solid tin dioxide) normally floats on the tin surface and moves to the near-exit of the tin tank, causing the scratching of glass bottom surface or attaching to the glass bottom surface.

SnO (gaseous tin oxide) comes from the tin bath and enters into atmosphere. Once it rises to the top of the furnace space (where the temperature away from the tin bath is relatively lower) near-roof area, the reaction 2SnO→Sn+SnO2 occurs, and the resultant Sn and SnO2 fall toward the tin bath. SnO2 will also be reduced by hydrogen in atmosphere to produce Sn, which also produces Sn that falls toward the tin bath.

In view of the foregoing, tin baths in flat/float glass sites many times use an atmosphere of nitrogen (N2) and hydrogen (H2) to reduce oxidation of the tin and thereby reduce defects on the finished glass. An atmospheric monitoring system is implemented herein for use with a tin bath. By continuously collecting data from various installed sensors, the system can monitor and control the H2/N2 mixture entering the furnace, the composition of the current atmosphere within the furnace at multiple locations, atmosphere flow direction within the tin bath furnace, and the purge gas exiting the furnace.

The composition of H2/N2 mixture can be measured and controlled by using various methods including thermal conductivity or molecular weight (calculated from standard methods such as gas chromatograph or by measuring density, pressure, and temperature and then using accepted gas equations of state).

The tin bath atmosphere gas composition can be measured using similar methods and additional parameters are useful to measure such as dew point or water concentration, O2 concentration, H2S or other sulfur compounds, tin bath metal and/or glass melt temperatures, tin redox state, and/or other parameters. Temperature and pressure sensors are installed at different positions for better tin bath furnace atmosphere flow pattern, which helps to further lower the oxygen level inside the tin bath furnace by removing oxygen mostly from the hot end. All of these parameters can be used to both verify that the tin bath atmosphere is running at optimal conditions, and to determine the optimal operation of the tin bath atmosphere control system by correlating the atmospheric conditions with the defect rate of the finished glass.

At vent positions, similar measurements can be performed as done for the tin bath atmosphere in addition to using methods to verify the outward flow of gas to reduce the likelihood of air ingress through any vent ports. The flow of gas can be verified by using standard accepted flow direction methods or pressure or temperature differentials where a higher upstream pressure or temperature indicates outward flow of gas from the tin bath atmosphere.

Oxygen leakage and therefore tin metal oxidation may not be detectable or preventable through tin bath atmosphere measurements alone due to limitations on the number of gas sampling ports available and/or the various points where oxygen leaks can occur. One remedy for this is the use of tunable diode lasers (TDL) that span the length and/or width of the tin bath atmosphere and provide a line average of the concentration along the beam path. Using multiple lasers allows for spatial resolution of the atmospheric conditions and therefore allows for spatial control of the gas flows. Additionally, it is advantageous to include a tin redox sensor to monitor the dissolved oxygen content in the tin metal bath during operation and adjust tin bath atmosphere flow, composition, and/or required venting to minimize tin metal oxidation.

The temperature of the glass entering the tin bath may also be a parameter that can be used to optimize tin bath venting or tin bath gas inlet flows. For example, the glass temperature is coupled to the solubility of tin bath atmosphere components and/or dissolved gas constituents in the glass melt itself such as oxygen, water vapor, and/or sulfur species and therefore this temperature can also influence tin bath operation and glass defect rates. The temperature of the glass entering the tin bath cannot be controlled within the tin bath itself, it must be controlled in the upstream glass melting furnace and/or refining zones. Therefore, optimum conditions for tin bath operation may be coupled to upstream processes in the overall glass melting process.

Various configuration are shown in FIGS. 1-4. For sake of clarity, not all possible configuration or measurement locations are shown, but by combining the options shown different configuration that are part of the invention can be put together. For example, pressure differential (dP) and temperature differential (dT) measurements are only shown at one vent flow, but one or both can be put at all vent flows in order to collect the needed information. In addition, where a "Measure" is indicated on a figure, this can be measurement of some of all of the options mentioned previously. Other measurement points can also be used based on the needs of the operation.

Figure 1:
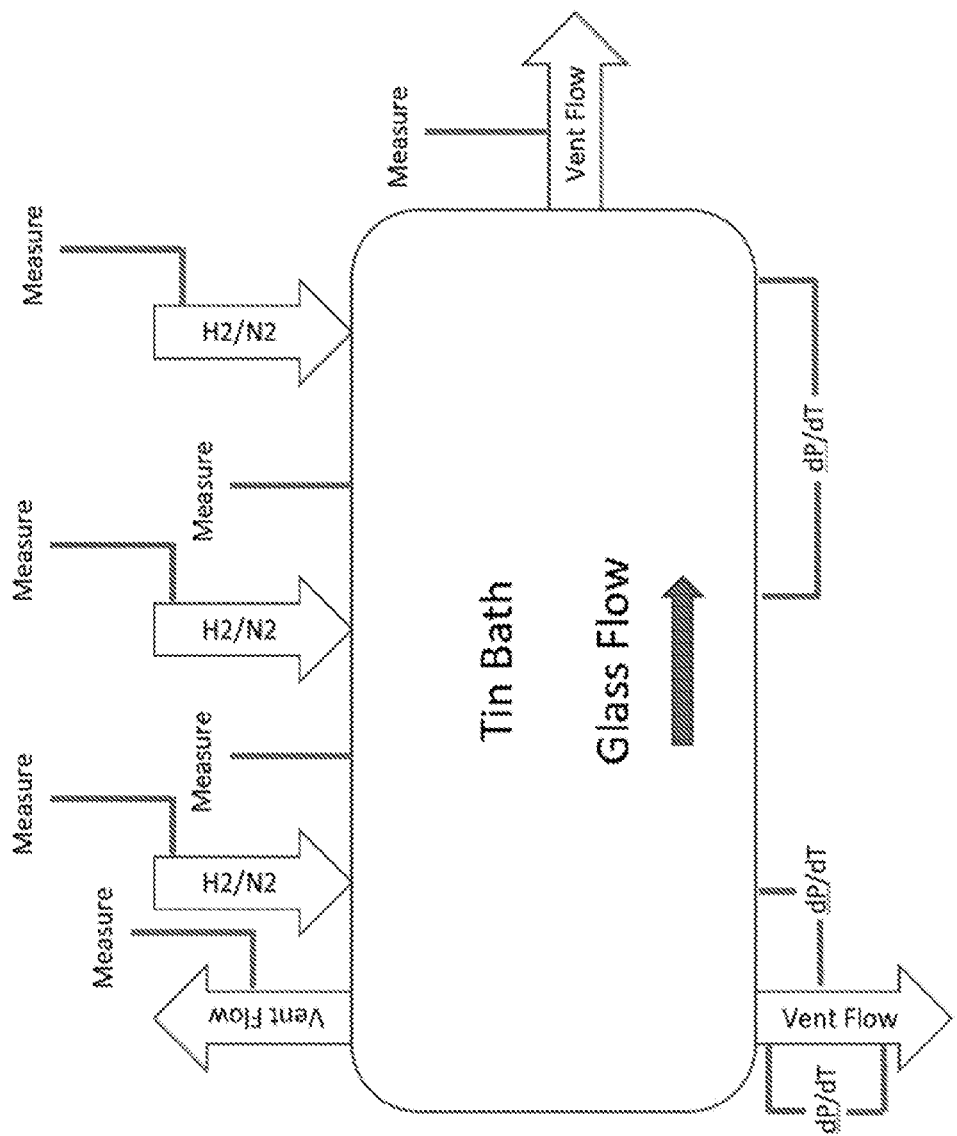
FIG. 1 is a schematic of a tin bath showing an embodiment of a system and method as described herein for monitoring and controlling the tin bath.

FIG. 1 shows an embodiment combining several features that can be applied separately or together. A tin bath furnace has a direction of glass flow. One or more measurement locations on the furnace can be used to determine density, one or more gas concentrations, dew point, or other relevant parameters. At least one gas flow inlet provides a flow of hydrogen and nitrogen mixture into the furnace. Each inlet flow can include a measurement location to determine density, one or more gas concentrations, dew point, or other relevant parameters. At least one vent flow allows exhaust gas to exit the furnace. Each vent flow can include a measurement location to determine density, one or more gas concentrations, dew point, or other relevant parameters.

Differential pressure and/or differential temperature measurements can be taken at various points. Such measurements on a vent flow can indicate both flow direction and flow rate. Such measurements between the furnace and vent flow, or between two furnace locations, can similarly indicate flow direction and/or flow rate.

Figure 2:
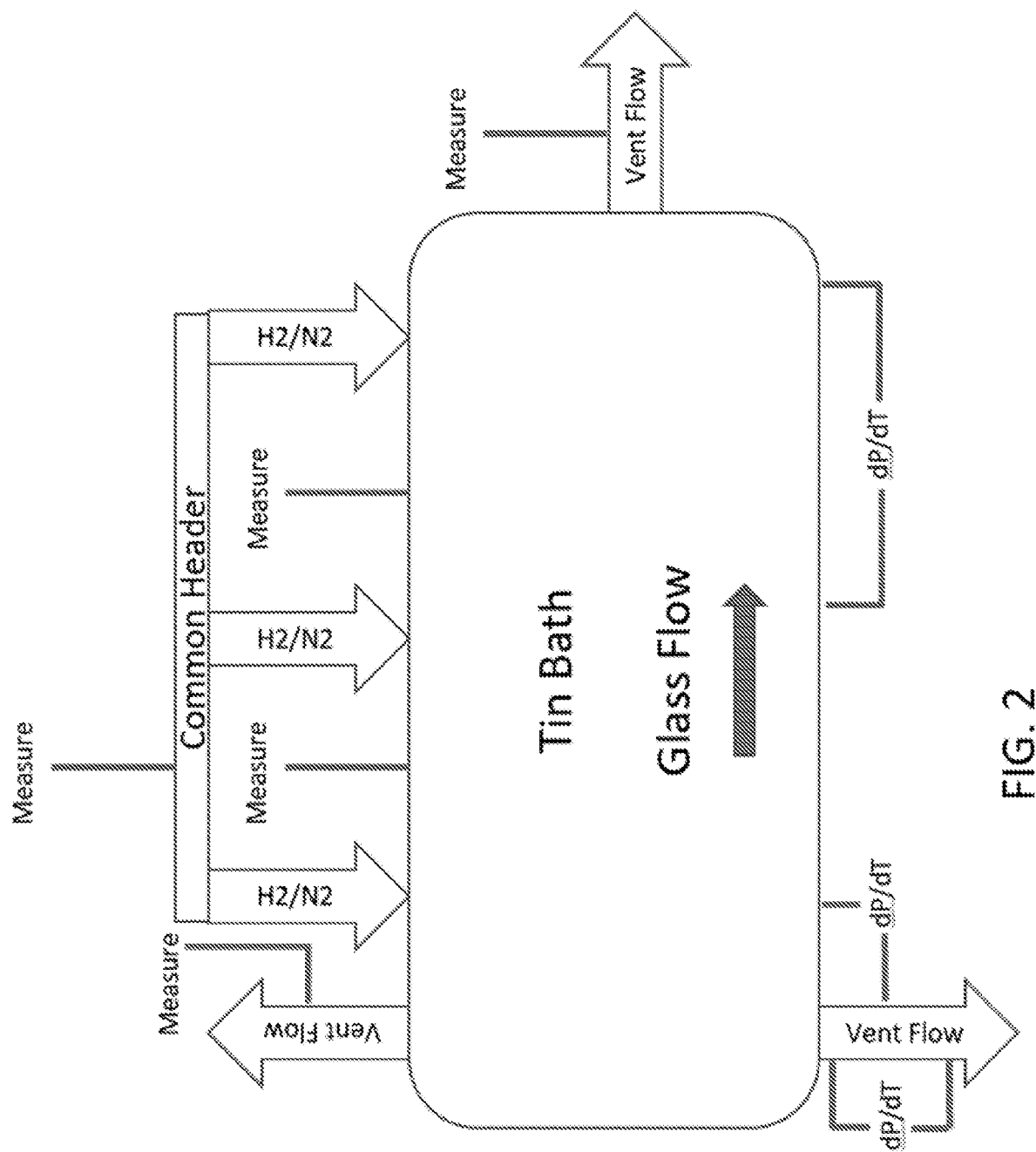
FIG. 2 is a schematic of a tin bath showing an embodiment of a system and method as described herein for monitoring and controlling the tin bath.

FIG. 2 shows an embodiment also combining several features that can be applied separately or together. FIG. 2 differs from FIG. 1 in that a common header feeds the inlet gas flows, thereby reducing the quantity of necessary measurement points.

Figure 3:
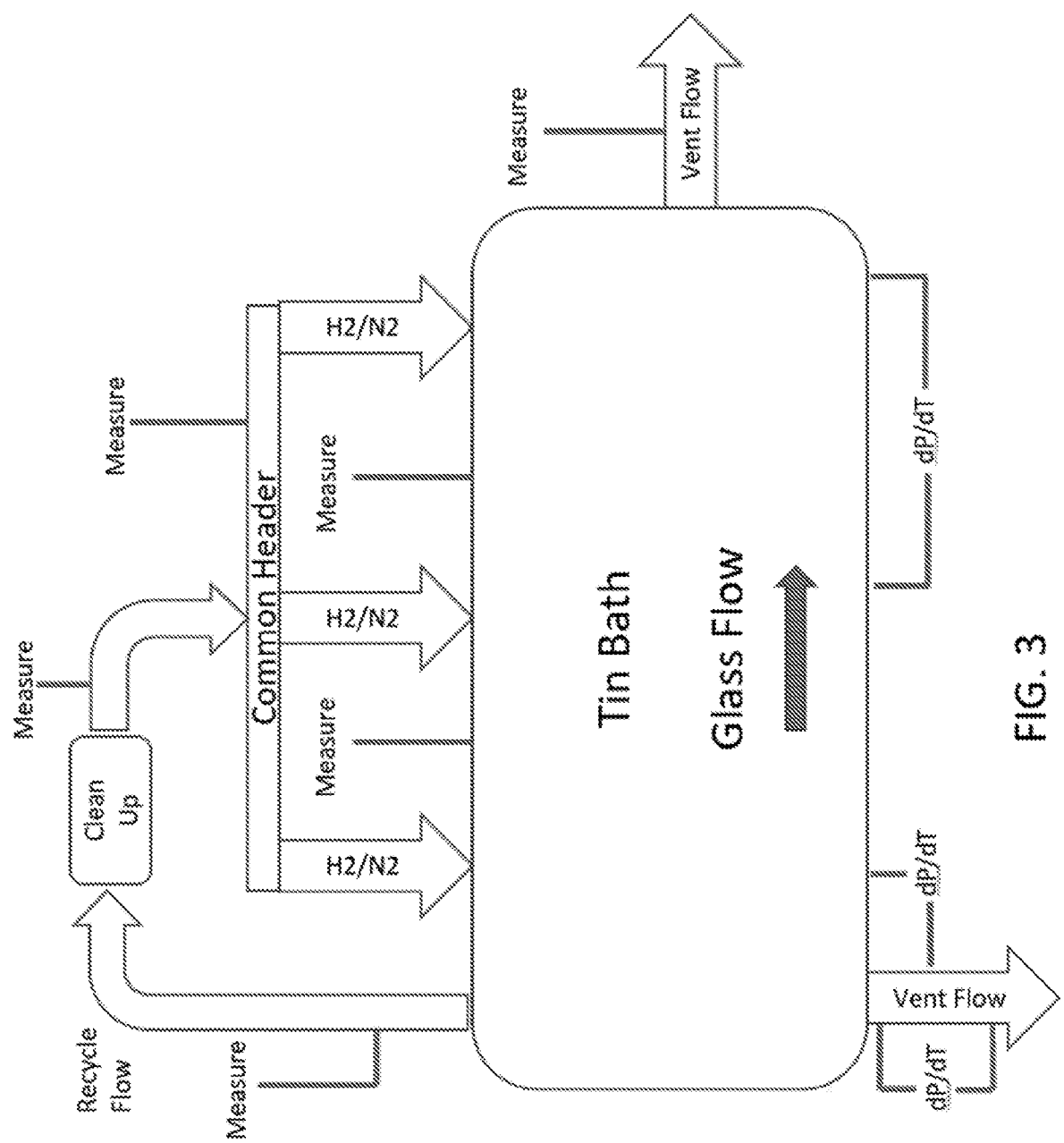
FIG. 3 is a schematic of a tin bath showing an embodiment of a system and method as described herein for monitoring and controlling the tin bath.

FIG. 3 shows an embodiment also combining several features that can be applied separately or together. FIG. 3 differs from FIG. 2 in the addition of a recycle flow. An unpurified recycle flow is extracted from the furnace, cleaned up to convert it to a purified recycle flow, and then recycled back into the inlet gas header. Measurement locations in the unpurified recycle gas and in the purified recycle gas can be used to evaluate whether inlet gas flow should be increased or decreased.

Figure 4:
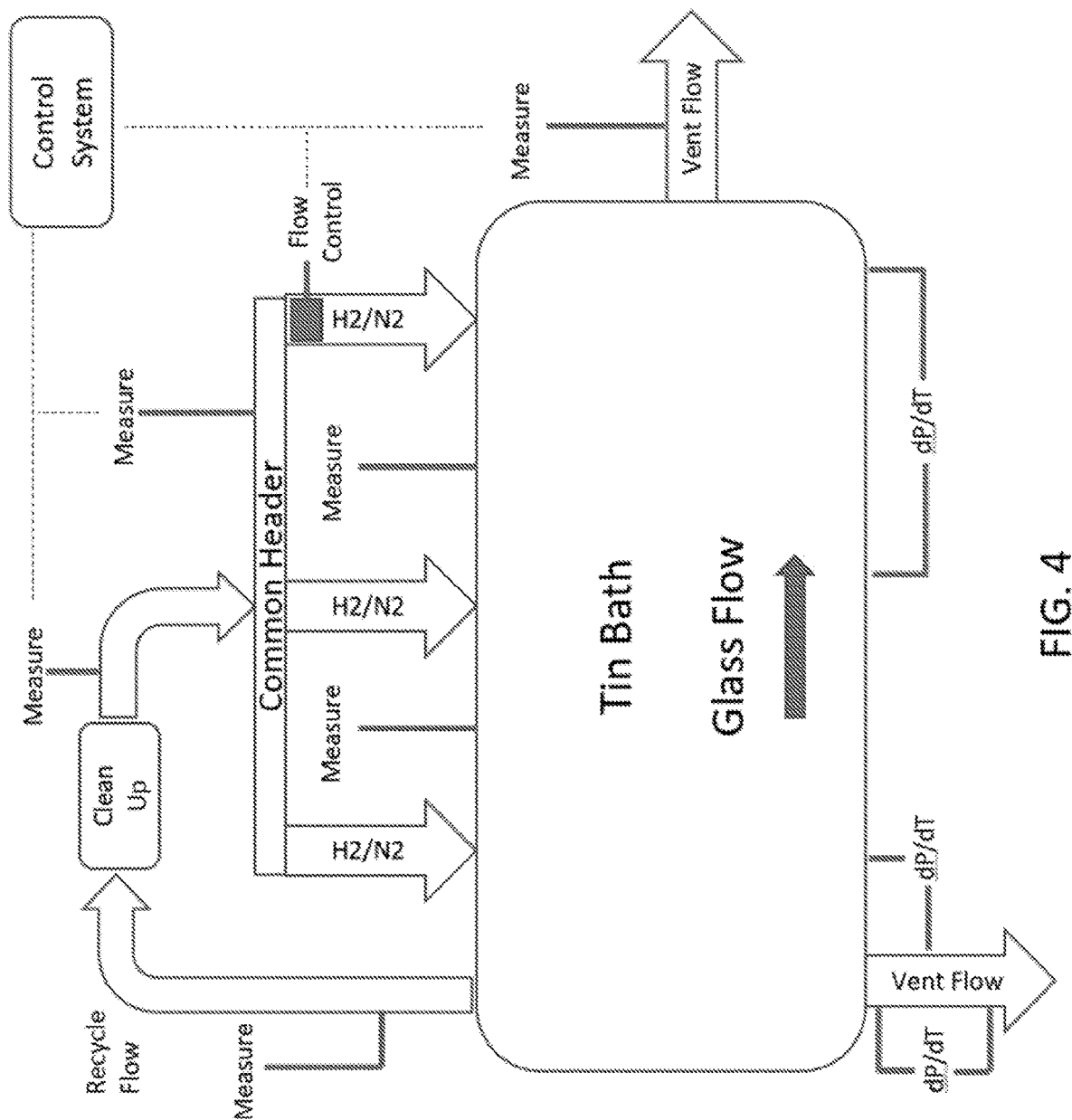
FIG. 4 is a schematic of a tin bath showing an embodiment of a system and method as described herein for monitoring and controlling the tin bath.

FIG. 4 shows an embodiment also combining several features that can be applied separately or together. FIG. 4 differs from FIG. 3 by the addition of flow control on at least one of the inlet gas streams. Inlet gas flow can be controlled in response to any of the foregoing measurements.

Combining the information collected with defect data needs to take into account the time lag between the atmospheric conditions (including input, vent, and recycle conditions) and the defect steps and the observation of the defects. This can be done using standard accepted analytical methods.

Once the correlations between the measured conditions and defects are better understood, these can be used for control purposes recognizing that optimum conditions can be a function of the glass composition, condition and purity of the tin bath, furnace heat loss due to aging and other conditions, ambient atmospheric conditions including temperature, pressure, and humidity, purity of the N2 and H2, gas injection temperatures, and condition of the heating elements and temperature differentials in the tin bath atmosphere.

Experiments were conducted measuring various parameters on an operating tin bath furnace to better understand the correlation between those parameters and defects in the glass, and to determine which parameters can be controlled in order to potentially reduce the occurrence of such defects.

Figure 5:
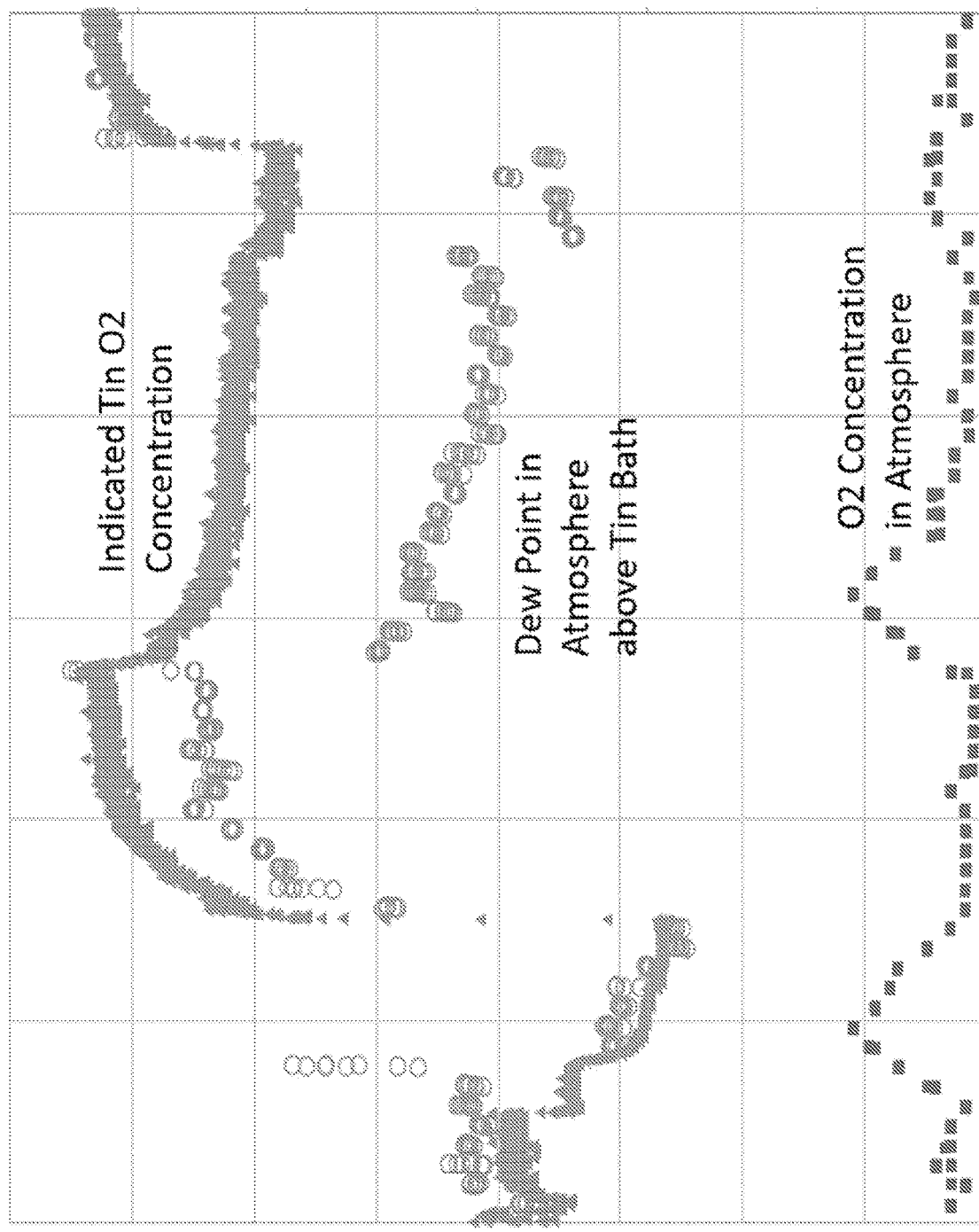
FIG. 5 is a graph showing a correlation between O2 potential (measure in ppm O2) in molten tin bath and atmosphere dew point above the glass, and the lack of a correlation to atmosphere O2 measurement above the glass bath. The top line on the graph with small triangle symbols is the indicated O2 concentration in the tin bath, the middle line on the graph with open circle symbols is the dew point for a location above the glass bath, and the bottom line on the graph with small square symbols is the O2 concentration in the atmosphere above the tin bath.

FIG. 5 shows measurements taken during a period of operation of the oxygen potential in the tin bath (which is indicative of oxygen concentration in ppm), the dew point of the atmosphere at a consistent location above the tin bath, and the oxygen concentration in the atmosphere above the tin bath at the same location. Note that the oxygen potential in the tin bath is difficult to measure, and when measured, the sensors do not last long, so it is desirable to find another easier-to-measure parameter that is indicative of this oxygen potential. In this case, it can be seen that dew point of the atmosphere above the tin bath correlates reasonably well with oxygen potential in the tin bath, and is much easier to measure consistently over a long period of time. Therefore, dew point can be used, alone or together with one or more other parameters (see discussion below) to control defects in the glass. In contrast, oxygen concentration in the atmosphere above the tin bath does not appear to correlate particularly well with oxygen potential in the tin bath.

Figure 6:
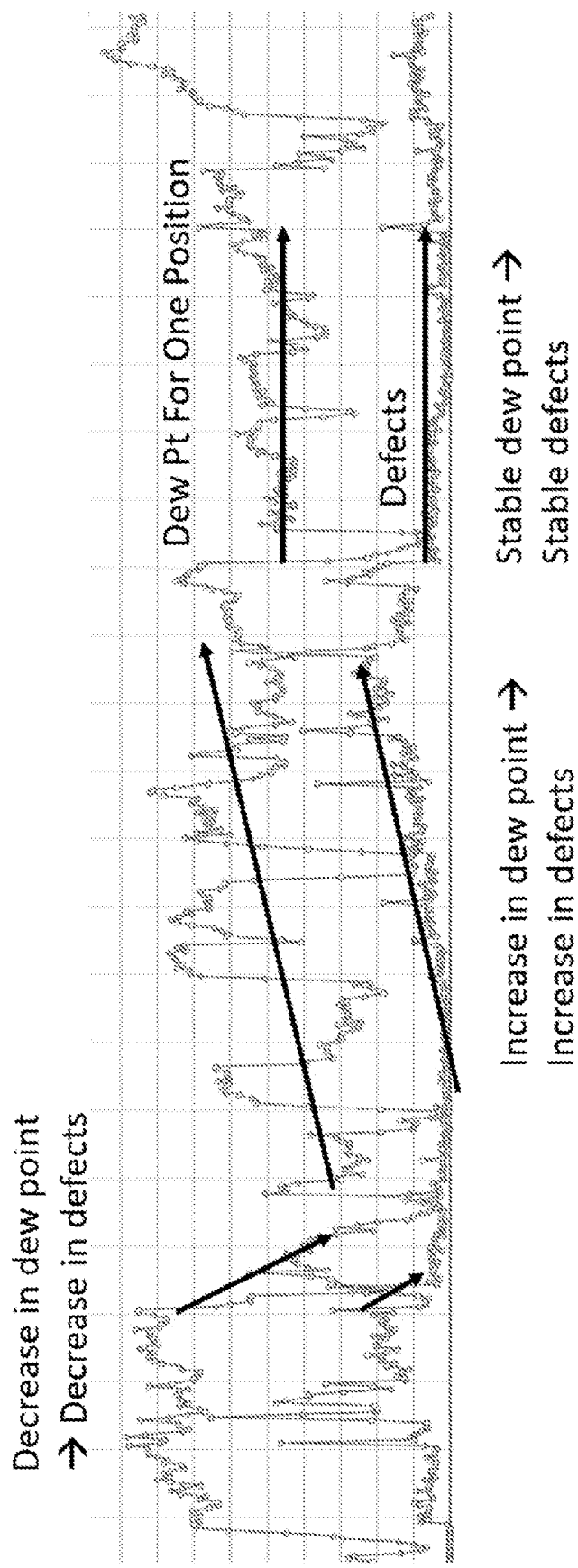
FIG. 6 is a graph showing the relationship between dew point above the glass and defects in the glass, and illustrates the benefits of maintaining a consistently low dew point.

FIG. 6 shows a direct positively-correlated relationship between measured dew point in the atmosphere above the tin and defects in the glass. In particular, when dew point decreases, so do defects, and when dew point increases, so do defects. Further, when dew point is stable, defects remain stable. One way to control the dew point so as to produce low levels of defects is to increase a flow rate of purge gas to lower dew point.

Figure 7:
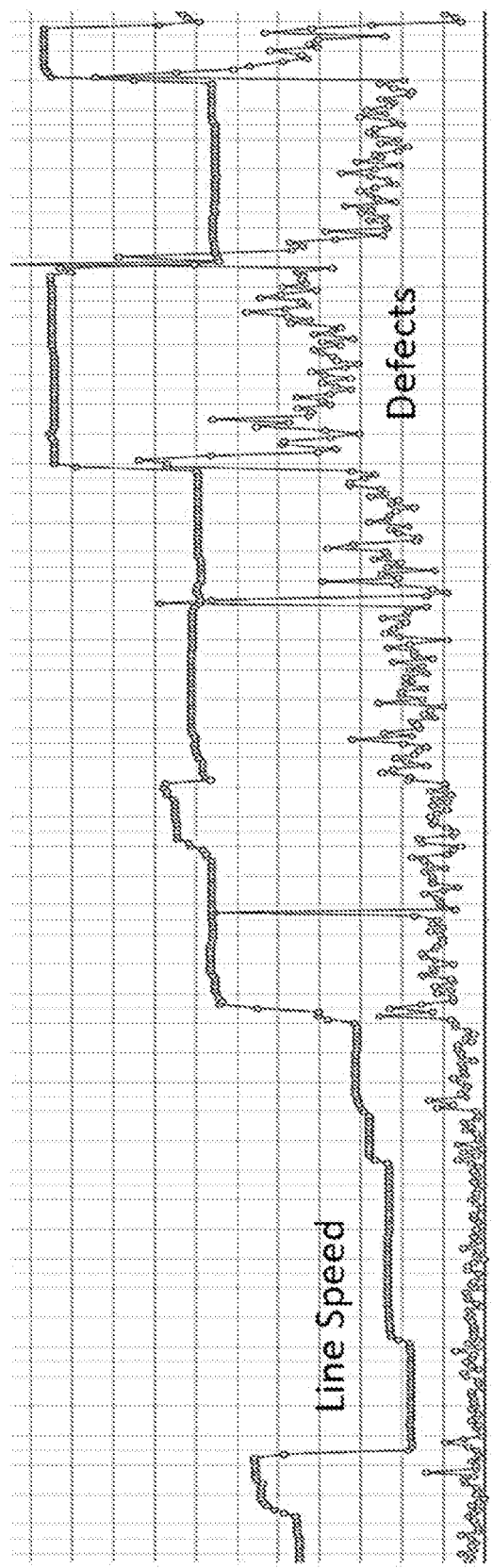
FIG. 7 is a graph showing the relationship between line speed (the production rate of glass product) and glass defects, and illustrates that line speed changes is one factor affecting defects (temporary), and that there is a positive correlation between line speed and defects.

FIG. 7 shows that there is also a direct positively-correlated relationship between line speed (i.e., the linear rate of float glass production through the system) and defects. Specifically, faster line speeds appear to lead to more defects, and increases in line speed result in increases in defects. Therefore, keeping a constant, and perhaps relatively low, line speed, may lead to lower levels of defects. Note that line speed is likely also inversely related to ribbon width (discussed below).

Figure 8:
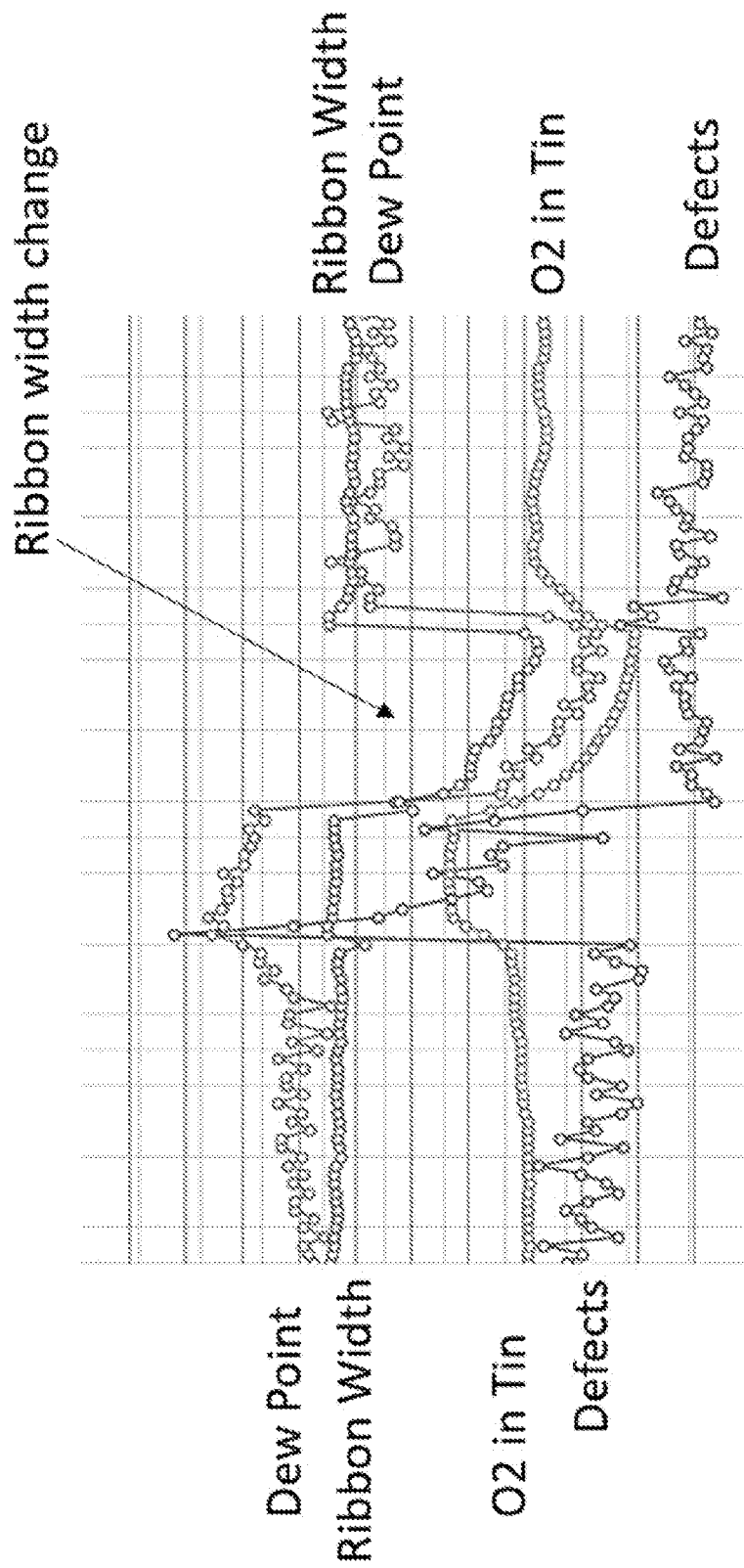
FIG. 8 is a graph showing the relationship between ribbon width, dew point, O2 in tin, and defects in the glass, and illustrates that immediately after the ribbon width decreases, the O2 in tin and dew point decrease, as do defects.

FIG. 8 shows that there is a direct positively-correlated relationship between ribbon width (as well as dew point in the atmosphere above the tin bath and oxygen concentration in the tin bath) with glass defects. More specifically, the glass defects are seen to decrease markedly upon a change of the ribbon width. In the center of the graph, ribbon width decrease, as dew point and oxygen concentration in the tin bath, and defects also sharply decrease. But even when ribbon width increases (along with dew point and oxygen concentration in the tin bath), the defects remain low. So it is believed that periodic changes in ribbon width may be beneficial to decrease glass defects. This may be due to periodic decreases in glass coverage of the tin bath that allow for regeneration of the tin bath oxygen levels.

Figure 9:
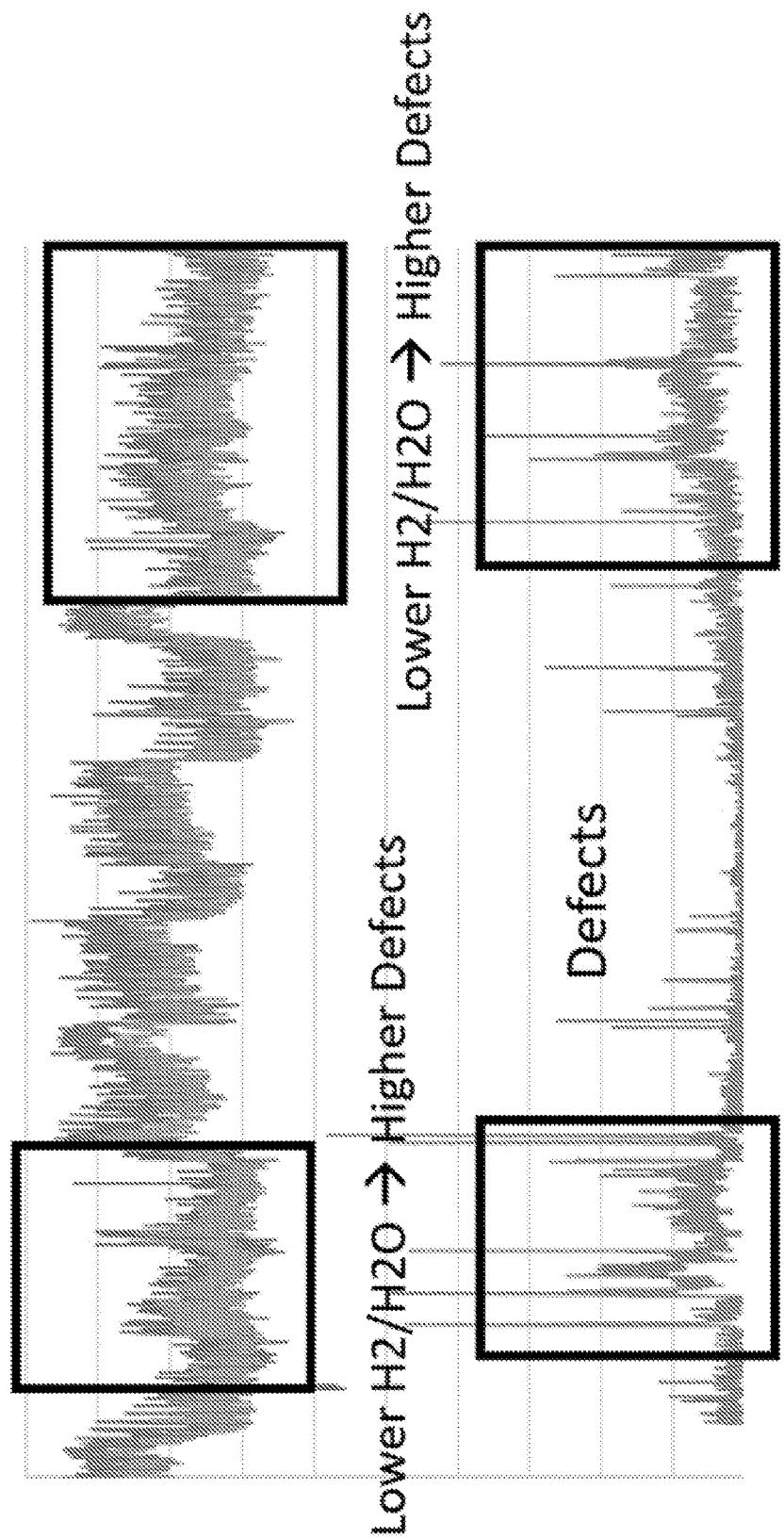
FIG. 9 is a pair of graphs showing the correlation between H2/H2O ratio near the glass surface (upper graph) and defects in the glass (lower graph), and illustrates that when the H2/H2O ratio is lower, the incidence of defects is greater.

FIG. 9 shows that a decrease in the ratio of hydrogen to dew point (water vapor content) in the atmosphere above the tin bath (i.e., the H2/H2O ratio) results in higher defects, and vice-versa. Therefore, maintaining a relatively high H2/H2O ratio can help keep defects low. Moreover, controlling the H2/H2O ratio, in combination with controlling the dew point, can be an effective method of controlling glass defects.

Near the tin bath and near the hot-end glass surface, the H2/H2O ratio controls the reaction rate of conversion of oxygen to water vapor (i.e., 2H2+O2→2H2O), which helps to bring the oxygen out from the tin bath and hot-end glass. Near the roof of furnace, the H2/H2O ratio controls the reaction rate of tin reduction (i.e., SnO2+H2→Sn+H2O), which reduces the solid phase SnO2 back to liquid Sn and increases the possibility of top-surface defect on glass product. In float glass production with the goal of reducing glass defects, conversion of oxygen to water vapor is desired in the lower zone near the tin bath and near the hot-end glass surface, but tin reduction is not desired in the upper zone near the roof of the furnace. Therefore, in these two zones, it may be desirable to maintain different H2/H2O ratios by separately and precisely adjusting for each zone the process gas flows into and/or out of the furnace (wherein the process gas flow contains one or both of nitrogen and hydrogen).

In addition, it is understood that when the density of the atmosphere in the tin bath furnace is measured, that density corresponds to a gas composition that may take into account more than just the concentrations of hydrogen and nitrogen. In particular, an increase in the measured gas density may indicate oxygen leakage into the furnace. In such a case, defects in the glass can be reduced by responding to an increase in density with a change in the process gas flow into our out of the furnace. In particular, increasing the concentration of hydrogen in the furnace, for example, by increasing hydrogen flow into the furnace by remove some of the excess oxygen due to indicate leakage and thereby reduce glass defects.

While the principles of the invention have been described above in connection with preferred embodiments, it is to be clearly understood that this description is made only by way of example and not as a limitation of the scope of the invention.

The invention claimed is:

1. A method of controlling defects in a glass product produced in a tin bath furnace, comprising:
   measuring at least one parameter of an atmosphere associated with the tin bath furnace, wherein the parameter includes a dew point of the atmosphere and/or a density of the atmosphere;
   correlating the measured parameter with defects in the glass product;
   controlling the measured parameter in a direction corresponding to decreased defects in the glass product by controlling a flow rate of a process gas relative to the tin bath furnace such that a flow rate of a purge gas exiting the tin bath furnace is increased to lower the dew point of the atmosphere to control the dew point of the atmosphere and the flow rate of the purge gas is decreased to increase the dew point of the atmosphere to control the dew point of the atmosphere; wherein the process gas includes one or more of hydrogen and nitrogen; and
   controlling a line speed of glass production to adjust a width of a ribbon of the glass product positioned on a tin bath of the tin bath furnace to decrease defects in the glass product.

2. The method of claim 1, wherein the at least one parameter is a dew point of the atmosphere, and wherein the dew point corresponds to a water vapor concentration in the atmosphere.

3. The method of claim 2, further comprising:
   measuring a density of the atmosphere associated with the tin bath furnace, wherein the measured density corresponds to hydrogen concentration in the atmosphere; and
   in addition to controlling the dew point, controlling a ratio of hydrogen to water vapor concentrations in the atmosphere in a direction corresponding to decreased defects in the glass product by controlling the flow rate of the process gas relative to the tin bath furnace.

4. The method of claim 2, further comprising:
   measuring a density of the atmosphere associated with the tin bath furnace, wherein the measured density corresponds to a gas composition in the atmosphere indicative of oxygen leakage into the tin bath furnace; and
   in addition to controlling the dew point, controlling a gas composition in the atmosphere in a direction corresponding to decreased defects in the glass product by controlling the flow rate of the process gas relative to the tin bath furnace.

5. The method of claim 1, wherein the at least one parameter is a density of the atmosphere, and wherein the density corresponds to a hydrogen concentration in the atmosphere.

6. The method of claim 1, wherein the at least one parameter is a density of the atmosphere, and wherein the density corresponds to a gas composition in the atmosphere indicative of oxygen leakage into the tin bath furnace.

7. The method of claim 1, wherein the controlling the flow rate of the process gas causes a decrease in the dew point of the atmosphere after the dew point is determined to be over a pre-selected threshold.

8. The method of claim 1, wherein the controlling the flow rate of the process gas causes an increase in the hydrogen concentration to increase a hydrogen to water vapor ratio in the atmosphere after the dew point is determined to be over a pre-selected threshold.

9. The method of claim 1, wherein the controlling the flow rate of the process gas causes a decrease in the oxygen concentration in the atmosphere after the dew point is determined to be over a pre-selected threshold.

10. The method of claim 1, wherein the controlling of the line speed of glass production to adjust the width of the ribbon of the glass product positioned on the tin bath of the tin bath furnace is performed to periodically change the width of the ribbon to regenerate oxygen levels in the tin bath and decrease glass defects.

11. The method of claim 10, wherein the change to the width of the ribbon includes changing the ribbon width is accomplished by decreasing the ribbon width.

12. The method of claim 1, wherein the controlled flow rate of the process gas is selected from: a flow rate of process gas into the tin bath furnace and a flow rate of the purge gas vented from the tin bath furnace.

13. The method claim 1, wherein the atmosphere is within the tin bath furnace and above the tin bath of the tin bath furnace.

14. The method of claim 13, further comprising:
    measuring a pressure differential in the furnace; and
    based on the measured pressure differential, determining furnace flow direction.

15. The method claim 1, wherein the atmosphere is of a vent flow from the tin bath furnace.

16. The method of claim 1, wherein the atmosphere is of a recycle gases vented from and recirculated back into the tin bath furnace.

17. The method of claim 1, wherein the atmosphere is of a gas flow into the tin bath furnace.

18. The method of claim 1, further comprising:
    optimizing furnace gas usage by taking into account a difference between one or more conditions of an inlet gas, a furnace gas, and a vent gas.

19. The method of claim 18, further comprising:
    determining a difference in a component concentration between gas in the tin bath furnace and the vent gas; and
    when the difference is large, increasing gas inlet flow.

20. The method of claim 18, further comprising:
    extracting an unpurified recycle gas from the furnace;
    cleaning up the unpurified recycle gas to create a purified recycle gas;
    mixing the purified recycle gas with an inlet gas;
    flowing the mixture of the inlet gas and the purified recycle gas into the furnace;
    determining a difference in a component concentration between the unpurified recycle gas and the purified recycle gas; and
    when the difference is large, increasing gas inlet flow.

21. A method of controlling defects in a glass product produced in a tin bath furnace, comprising:
    measuring at least one parameter of an atmosphere associated with the tin bath furnace, wherein the parameter is selected from the group consisting of a dew point of the atmosphere and a density of the atmosphere and wherein the atmosphere is of a vent flow from the tin bath furnace;

correlating the measured parameter with defects in the glass product;

controlling the measured parameter in a direction corresponding to decreased defects in the glass product by controlling a flow rate of a process gas relative to the furnace wherein the process gas includes one or more of hydrogen and nitrogen;

correlating a line speed of glass production with defects in the glass product and controlling the flow rate of the process gas in a direction corresponding to decreased defects in the glass product;

measuring a pressure differential and a temperature differential in the vent flow; and based on the measured pressure differential and the measured temperature differential, determining vent flow direction and vent flow rate.

22. A method of controlling defects in a glass product produced in a tin bath furnace, comprising:

measuring a dew point of an atmosphere associated with the tin bath furnace;

correlating the measured dew point with defects in the glass product;

controlling the dew point in a direction corresponding to decreased defects in the glass product by controlling a flow rate of a process gas relative to the furnace such that the flow rate of a purge gas exiting the tin bath furnace is increased to lower the dew point of the atmosphere to control the dew point of the atmosphere and the flow rate of the purge gas is decreased to increase the dew point of the atmosphere to control the dew point of the atmosphere, wherein the dew point corresponds to a water vapor concentration in the atmosphere, and wherein the process gas includes one or more of hydrogen and nitrogen;

measuring a density of the atmosphere associated with the tin bath furnace, wherein the measured density corresponds to a hydrogen concentration in the atmosphere; and controlling a ratio of hydrogen to water vapor concentrations in the atmosphere in a direction corresponding to decreased defects in the glass product by controlling the flow rate of the process gas relative to the furnace to increase the ratio of the hydrogen to the water vapor concentrations in response to the measured dew point being above a pre-selected threshold.

* * * * *